(12) United States Patent
Aintabi

(10) Patent No.: US 12,709,913 B2
(45) Date of Patent: Aug. 18, 2026

(54) ARTIFICIAL INTELLIGENCE CONTROL SYSTEM FOR AERIAL SUNSHADE DEVICES

(71) Applicant: Vandewater Capital Holdings, LLC, New York, NY (US)

(72) Inventor: Jason Aintabi, New York, NY (US)

(73) Assignee: Vandewater Capital Holdings, LLC, New York, NY (US)

( * ) Notice: Subject to any disclaimer, the term of this patent is extended or adjusted under 35 U.S.C. 154(b) by 301 days.

(21) Appl. No.: 18/523,587

(22) Filed: Nov. 29, 2023

(65) Prior Publication Data

US 2024/0093528 A1 Mar. 21, 2024

Related U.S. Application Data

(63) Continuation-in-part of application No. 18/339,010, filed on Jun. 21, 2023, now Pat. No. 12,060,725, and (Continued)

(51) Int. Cl.
*E04H 15/04* (2006.01)
*B64B 1/40* (2006.01)

(Continued)

(52) U.S. Cl.
CPC ............... *E04H 15/04* (2013.01); *B64B 1/40* (2013.01); *G01W 1/02* (2013.01); *E04H 15/00* (2013.01); *Y02E 70/30* (2013.01)

(58) Field of Classification Search
CPC ........... E04H 15/04; E04H 15/00; B64B 1/40; G01W 1/02; Y02E 70/30
See application file for complete search history.

(56) References Cited

U.S. PATENT DOCUMENTS

| | | |
|---|---|---|
| 3,337,162 A | 8/1967 | Bauserman |
| 3,565,368 A | 2/1971 | Byron |

(Continued)

FOREIGN PATENT DOCUMENTS

| | | |
|---|---|---|
| CA | 2829781 A1 | 9/2012 |
| CN | 105626375 A | 6/2016 |

(Continued)

OTHER PUBLICATIONS

Wikipedia (Hot Air Balloon, Wayback Machine, Feb. 9, 2020, https://web.archive.org/web/20200209113153/https://en.wikipedia.org/ wiki/Hot_air balloon) (Year: 2020).

(Continued)

*Primary Examiner* — Richard M Camby
(74) *Attorney, Agent, or Firm* — St. Onge Steward Johnston & Reens LLC; Stephen P. McNamara

(57) ABSTRACT

An artificial intelligence system control for controlling a plurality of aerial sunshade devices. The aerial sunshade devices have a canopy for providing shade, one or more electrically powered lifting devices, a rechargeable battery power system operatively connected to the at least one lifting device, one or more solar cells operatively connected to the battery power system to charge the battery power system, and a sunshade management system controlling the one or more lifting devices to activate the lifting devices to position the sunshade device. The system control provides sunshade instructions to the plurality of aerial sunshade devices via a traffic and location controller and a wireless network. The sunshade instructions include altitude and geolocation positioning instructions for each aerial sunshade device. A machine learning system which has a data processing module having a data input component, a sunshade efficacy model, a data output component, and one or more (Continued)

artificial intelligence layers which produce solar heating profiles, which are provided to the system control.

24 Claims, 4 Drawing Sheets

Related U.S. Application Data a continuation-in-part of application No. 17/514,994, filed on Oct. 29, 2021, now Pat. No. 11,863,697, said application No. 18/339,010 is a continuation of application No. 17/237,738, filed on Apr. 22, 2021, now Pat. No. 11,708,704.

(60) Provisional application No. 63/013,668, filed on Apr. 22, 2020.

(51) Int. Cl.
*G01W 1/02* (2006.01)
*E04H 15/00* (2006.01)

(56) References Cited

U.S. PATENT DOCUMENTS

| | | | | |
|---|---|---|---|---|
| D438,589 | S | 3/2001 | Brown | |
| 6,327,994 | B1 * | 12/2001 | Labrador | B63B 39/06 114/382 |
| D622,896 | S | 8/2010 | Bear | |
| 8,857,758 | B2 | 10/2014 | Al-Garni et al. | |
| 9,091,462 | B2 | 7/2015 | Ratti et al. | |
| 9,775,305 | B2 | 10/2017 | Choi | |
| 10,151,120 | B1 | 12/2018 | Kaneshiro | |
| D847,486 | S | 5/2019 | Morel | |
| D852,489 | S | 7/2019 | Morel | |
| 10,352,063 | B2 | 7/2019 | Jensen | |
| 10,689,084 | B2 * | 6/2020 | Knoblach | G01W 1/08 |
| 11,708,704 | B2 | 7/2023 | Aintabi | |
| 11,958,605 | B2 * | 4/2024 | Aintabi | H02S 30/20 |
| 2004/0075411 | A1 | 4/2004 | Evans | |
| 2004/0226594 | A1 * | 11/2004 | Connelly | E04H 15/58 135/117 |
| 2011/0315811 | A1 | 12/2011 | Al-Garni | |
| 2012/0069464 | A1 | 3/2012 | Murakami | |
| 2012/0291830 | A1 * | 11/2012 | Crimi | E04H 15/58 135/117 |
| 2016/0307448 | A1 * | 10/2016 | Salnikov | A01C 21/00 |
| 2018/0297684 | A1 * | 10/2018 | nikolic | B64B 1/06 |
| 2021/0332604 | A1 | 10/2021 | Aintabi | |
| 2022/0194583 | A1 * | 6/2022 | Zima | A63H 27/10 |
| 2023/0132459 | A1 | 5/2023 | Aintabi | |
| 2023/0132543 | A1 | 5/2023 | Aintabi | |
| 2023/0349188 | A1 | 11/2023 | Aintabi | |
| 2024/0407513 | A1 * | 12/2024 | Al-Sammarie | A45B 23/00 |

FOREIGN PATENT DOCUMENTS

| | | | |
|---|---|---|---|
| CN | 105775097 | A | 7/2016 |
| CN | 209883246 | U | 1/2020 |
| GB | 2492806 | A | 1/2013 |
| KR | 102015787 | B1 | 8/2019 |
| WO | 2018209454 | A1 | 11/2018 |

OTHER PUBLICATIONS

Wikipedia (Solar Balloon, Wayback Machine, Apr. 1, 2019, https://web.archive.org/web/20190401032428/https://en.wikipedia.org/ wiki/Solar balloon) (Year: 2019).

* cited by examiner

ARTIFICIAL INTELLIGENCE CONTROL SYSTEM FOR AERIAL SUNSHADE DEVICES

FIELD OF THE INVENTION

The present invention relates to technology for climate change mitigation, forest fire prevention, and glacial and forest preservation. More specifically, the present invention provides an artificial intelligence control system for a network of sunshade devices which provide shade and reflect/absorb solar radiation on an adaptable and large-scale basis to prevent undesired warming.

BACKGROUND OF THE INVENTION

Climate change has become a significant threat to both the natural environment and man-made structures and practices. Rising temperatures have resulted in melting of the polar ice caps and glaciers, causing rising sea levels. The melting ice caps threaten many major cities, communities, wildlife, and food sources. Higher temperatures have also resulted in increased droughts in parts of the world, impacting food production, but also leading to large accumulations of dead and dried-out plants and trees. Dry plant matter has served as fuel for large devastating fires in many parts of the world, including notably, in California and Australia.

Technologies such as green energy generation, carbon capture in fossil fuel power plants, and smart energy grid technologies are just a few examples of approaches that have been developed to combat the global climate change issue. These technologies are helpful in controlling worldwide climate change, by reducing carbon dioxide production, and thus reducing a significant driver of climate change. However, such technologies do not provide reduction of warming in particular locations.

A more localized approach for controlling climate change in specific locations is the use of sunshades and other shading technology to prevent solar heating of surface features.

Solar shades provided over surface features such as polar ice caps, glaciers, and the like, should reduce their surface temperatures and decrease their melting rate. Solar shades over open land areas such as forests, plains, and other areas subject to the risk of wild fires, should lower their ambient temperatures, allowing greater moisture retention, thereby reducing the fuel available for fires.

Previously proposed systems have never been successfully implemented in a large scale system. Small scale shades may be useful for urban and suburban environments, and some shade coverings have been used in farming. The use of large-scale, aerially suspended solar shading technology for large areas is extremely challenging due to environmental conditions, such as changing seasons, high winds, storms, and other climate-related events.

I have previously disclosed various sunshade devices in my commonly owned U.S. patent application Ser. No. 17/237,738, published as Pub. No. US 2021/0332604 A1, and U.S. Pat. No. 11,708,704; and in my commonly owned and co-pending U.S. patent application Ser. No. 17/514,974, published as Pub. No. US 2023/0132459 A1, and U.S. patent application Ser. No. 17/956,341, Pub. No. US 2023/0132543 A1, and U.S. patent application Ser. No. 18/339,010, Pub. No. US 2023/0349188A1; the disclosures of all of which are hereby incorporated by reference.

However, there remains a need for technology providing for a way to control positioning of the sunshade devices to maximize the effectiveness of solar shading over critical or at risk areas which can continuously adapt to ever changing climate and environmental events.

SUMMARY OF THE INVENTION

It is an object of the present invention to provide an artificial intelligence control system for aerial sunshade devices, which is capable of managing the geolocation, elevation and shape of the sunshade and adapting its use to environmental factors.

Aerial sunshade devices for use with the present invention preferably include a reflective canopy, desirably provided with solar cells that generate electricity when the sunshade device is open. Materials such as reflective white or metallized plastic films and reflective metal foils are preferred, however, fabrics such as reflective white woven and nonwoven fabrics may be used. In some embodiments, the reflective canopy is integral with or is part of a collapsible web or frame.

The aerial sunshade devices are controlled by a sunshade management system. The sunshade management system controls one or more lifting devices provided in the reflective canopy which periodically are activated to lift the sunshade device to a certain altitude, whereupon the lifting devices are deactivated or turned down to reduce lift. The aerial sunshade device in such cases will experience a slow drifting descent, similar to a parachute, until a minimum altitude is reached, whereupon the lifting devices are activated again. The aerial sunshade device accordingly repeatedly oscillates in elevation above the earth's surface. The oscillating aerial sunshade device preferably closes up to reduce its area during lifting to reduce drag during periods of ascent, and opens to provide shade and air resistance during periods of descent.

The lifting devices manage the elevation, shape and geolocation of the sunshade device as well as adapting to changing weather patterns and weather-related events. The lifting devices help maintain the elevation and angle (pitch) and geolocation (latitude and longitude) of the aerial sunshade device. In some embodiments, the lifting devices include lift balloons. In other embodiments, the lifting devices are propeller devices. For example, one or more unmanned aerial vehicles (UAVs) ("drone") devices may be used as lifting devices. Some preferable embodiments of the lifting devices include solar cells to absorb solar energy and generate electricity, and batteries to store the generated electricity.

A sunshade management system for controlling the elevation and angle (pitch) and/or shape, and geolocation (latitude and longitude) of the sunshade is provided. The sunshade management system preferably employs one or more sensors to record and assess changing weather patterns and other information. The management system is also preferably in electronic communication with the one or more lifting devices. The management system's one or more sensors preferably include information on wind speed, direction, and variation, intensity of the sun's rays and angle of the sun, ambient temperature and humidity, barometric pressure, geolocation and elevation from the earth's surface, temperature and humidity at the earth's surface, precipitation status, levels, and intensity, and other maintenance related information, such as damage to the sunshade's canopy, low-power or malfunctioning lifting devices, etc.

An artificial intelligence system control is provided to control a plurality of the aerial sunshade devices. The system control provides sunshade instructions to the plurality of aerial sunshade devices via a traffic and location controller and a wireless network. The sunshade instructions include altitude and geolocation positioning instructions for each aerial sunshade device. A machine learning system which has a data processing module having a data input component, a sunshade efficacy model, a data output component, and one or more artificial intelligence layers which produce solar heating profiles, which are provided to the system control.

The system control instructs the sunshade management system of each aerial sunshade device, which the controls the lifting devices to position the aerial sunshade device as instructed. The aerial sunshade device under control of the system control can be held substantially in place as long as needed to provide shading to achieve climate change mitigation when conditions are appropriate. However, the system control can ground the sunshade device according to a predetermined schedule, or on an expedited basis when needed due to sudden and severe weather-related events or emergencies. After conclusion of the event or emergency, the system control can re-elevate the sunshade device.

As those skilled in the art will appreciate, the present invention is not limited to the embodiments and arrangements described above. Other objects of the present invention and its particular features and advantages will become more apparent from consideration of the following drawings and detailed description of the invention.

DETAILED DESCRIPTION OF THE INVENTION

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present invention is not limited to those embodiments described hereafter.

Figure 1:
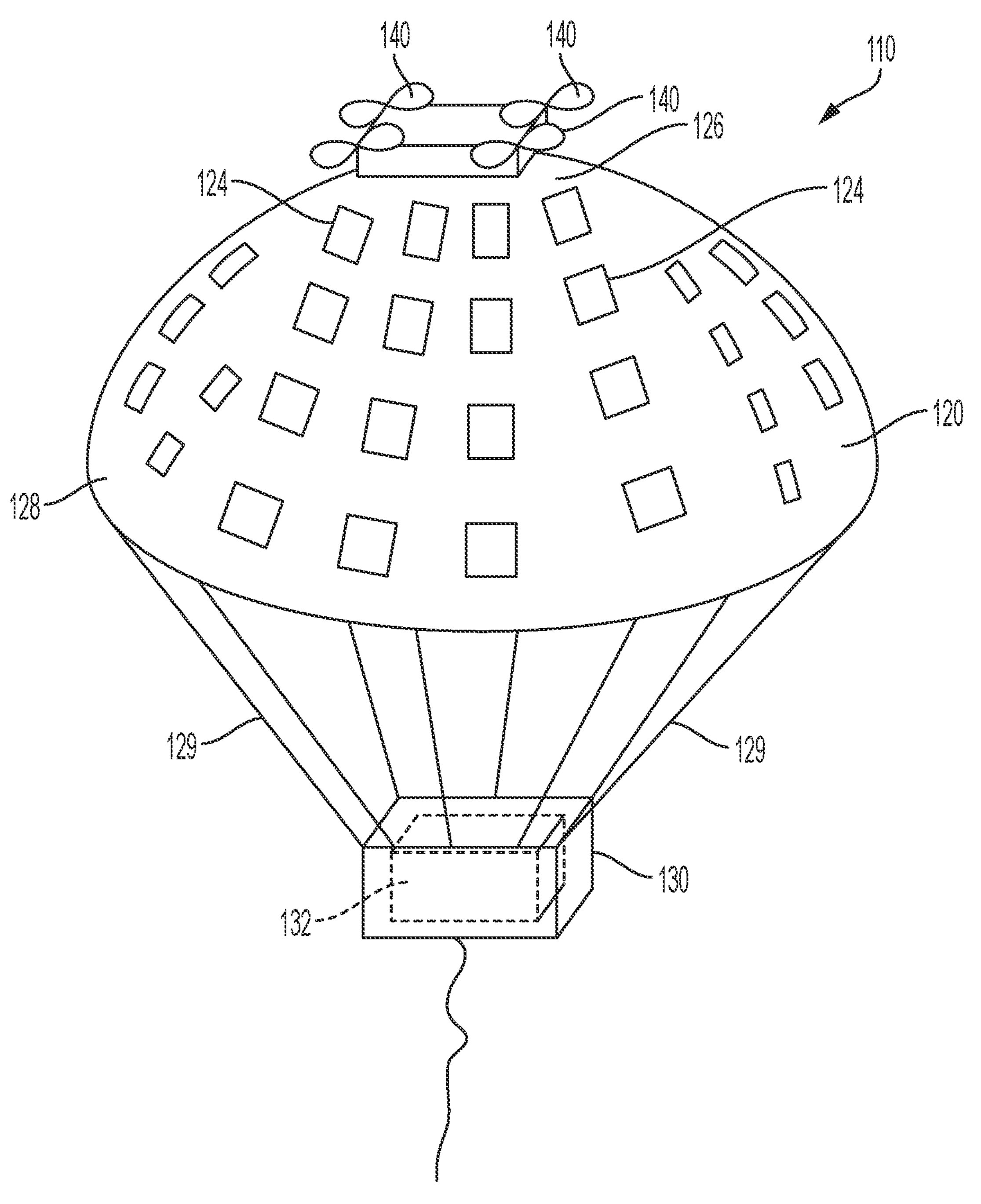
FIG. 1 depicts a perspective view of an exemplary aerial sunshade device in use at an elevation above the earth's surface according to present invention.

Referring first to FIG. 1, an exemplary sunshade device 110 is shown. Sunshade device 110 is used to shade a portion of landscape containing a forest or a glacier, cooling the local environment and reducing heating and drying out of forested or glaciated areas. Sunshade device 110 includes a canopy 120 for providing shade from the sun, formed of a flexible lightweight sheet material. In some embodiments, canopy 120 is a reflective material and may have tubular channels containing helium or other lighter than air gases to assist with maintaining the canopy's elevation. Materials such as reflective white or metallized plastic films and reflective metal foils are preferred, however, fabrics such as reflective white woven and non-woven fabrics (such as a white fabric or a white knitted material). The canopy 120 may be a solid sheet material or a perforated or otherwise discontinuous sheet material. For example, the canopy may comprise a film, or a perforated film, or a non-woven or knitted white fabric. In some embodiments, canopy 120 is preferably fabricated from, or coated with, a fire-retardant material. In some embodiments, canopy 120 is fabricated from a combination of different materials to provide a laminated sheet having multiple materials providing multiple desired qualities or benefits.

In some embodiments of the invention, a portion or all of canopy 120 is formed of a variable stiffness film material such as described in U.S. Pat. No. 10,257,929 (the disclosure of which is hereby incorporated by reference), which can become stiffer and more rigid upon the application of an electrical charge. In such case, opening of the canopy 120 can be additionally initiated and maintained by providing an electrical charge to the canopy film material.

In preferred embodiments, the canopy 120 is provided with a plurality of solar cells 124 for receiving sunlight and converting it to electrical energy to charge the rechargeable battery power system 130 which powers the sunshade device 110, and in particular its avionics and telematics systems and its electrically powered lifting devices 140 described below. In particularly preferred embodiments, the canopy 120 is fabricated from a flexible solar panel film containing embedded solar cells 124.

Canopy 120 has a central portion 126 and a peripheral portion 128. Canopy 120 is preferably symmetric in shape. In one embodiment shown in FIG. 1, canopy 120 is generally circular in shape; but it may optionally include a plurality of canopy arms extending radially from the central portion 126 of the canopy 120. In other embodiments, the canopy 120 may be generally square, or rectangular as in FIG. 2, or triangular, or other polygonal shapes, or oval or semi-circular or semi-oval or other curved and partially curved shapes.

A rechargeable battery power system 130 is operatively connected to the solar cells 124 which charge the battery power system 130 when solar cells 124 are exposed to sunlight. The battery power system includes one or more battery storage units 132 which are preferably a high capacity 12 volt (or higher) battery, sized to deliver sufficient electrical power to an electrically powered lifting device(s) 140 for a sufficient period to lift the sunshade device to a selected altitude, and retain the sunshade device at the desired altitude for a time period of at least 30, 45, 60, 90, 120, 150, or 180 minutes. In other embodiments, the battery storage units may be formed of film materials and made as part of the canopy 120.

Preferably, the one or more battery storage units 132 of the rechargeable battery power system 130 are contained in a container suspended from the peripheral portion 128 of the canopy 120 below the canopy 120 by lines 129. Lines 129 may be formed of cord, rope, wire, or fabric.

The battery power system 130 further includes a battery management system to monitor the battery power and reduce power usage by components of the sunshade device 110 at the direction of a sunshade management system 150 when battery power levels fall below a minimum threshold.

Figure 2:
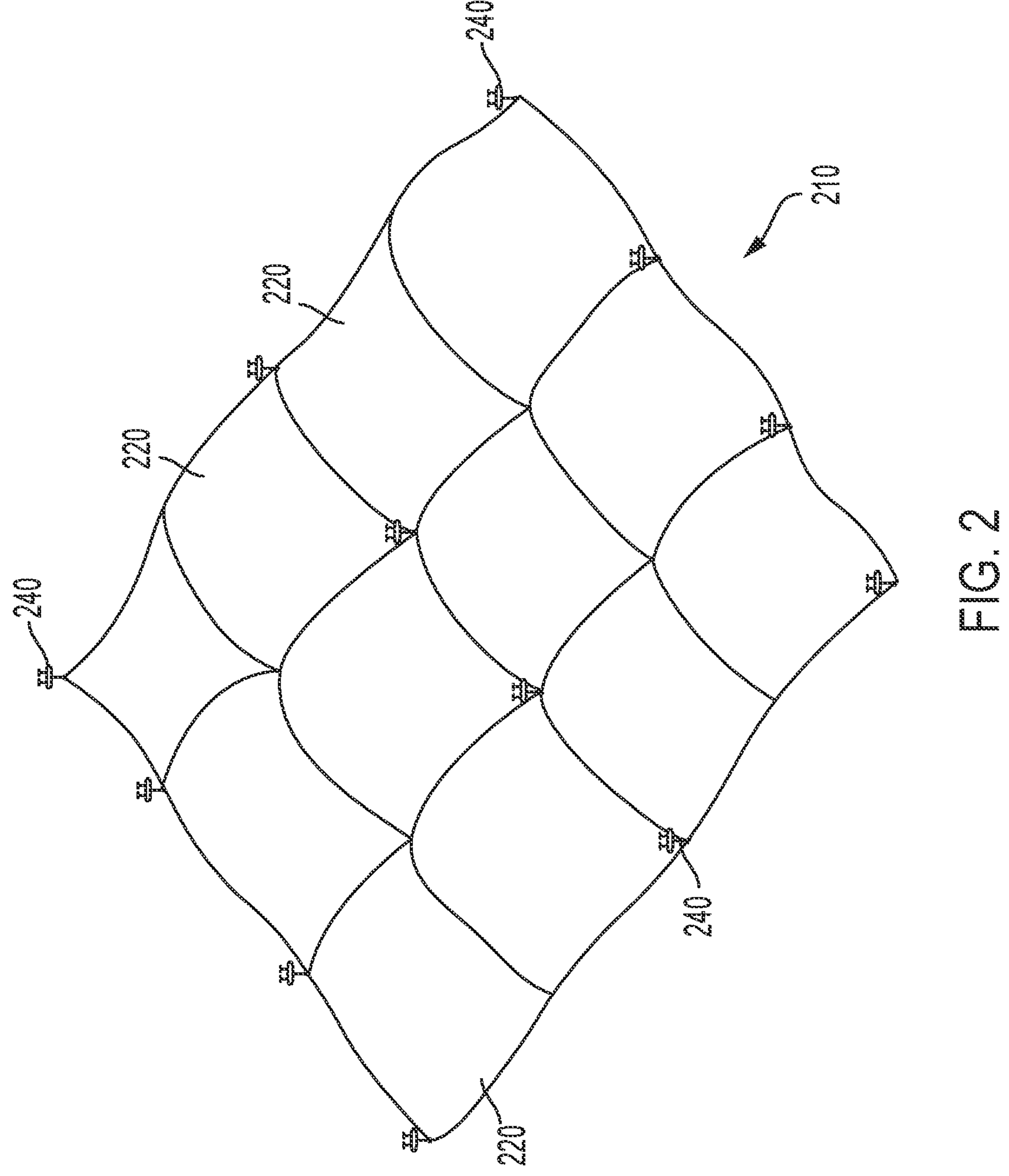
FIG. 2 depicts a perspective view of another exemplary aerial sunshade device in use at an elevation above the earth's surface according to present invention.

There is at least one electrically powered lifting device 140 attached to the canopy 120. In FIG. 1, there is a single lifting device 140 in a central part of the canopy. In FIG. 2 there are a plurality of lifting devices 240 distributed around canopy 220 of aerial sunshade device 210. The electrically powered lifting devices 140, 240 are preferably one or more propeller-driven devices having rotors or propellers. Lifting devices 140 may have a single propeller or rotor, or multiple propellers or rotors. Preferably, a four rotor quadcopter drone embodiment is used, but anywhere from one to twenty rotors may be used. The number and size of each rotor may be selected depending on the size of the sunshade device 110 and its weight to be lifted. The preferred embodiment is expected to be a single quadcopter arrangement, however, potentially 1, 2, or 4 quadcopter arrays could be used.

The rotors are driven by appropriately sized electrical motors. The at least one lifting device 140 is operatively connected to the rechargeable battery power system 130 to drive the electrical motors when directed by the sunshade management system 150.

Appropriate aircraft warning lights are provided on the lifting device 140 and the peripheral portion 128 of canopy 120, and potentially, elsewhere on the canopy 120 and on the container 133. Typical blinking red lights may be used to provide visibility to the sunshade device 110, both when it is airborne and grounded.

Quadcopter (also known as quadrotor) drone technology is very well developed at this time, and in one preferred embodiment, the lifting device 140 and parts of the control systems of the sunshade management system 150 are implementations of known quadcopter concepts. Quadcopters generally have four rotors, two rotors spinning clockwise and two counterclockwise. The four rotors provide opposing torques, and can be individually manipulated to steer the quadcopter.

There are four primary movements that a quadcopter employs and they are controlled by each of the four rotors. In a typical layout, rotors 1 and 4 rotate clockwise, while rotors 2 and 3 rotate counterclockwise. Yaw is the clockwise or counterclockwise spin of a quadcopter. Yaw is used to rotate left, by operating rotors 1 and 4 propellers at normal speed, and rotors 2 and 3 at high speed. To rotate right, rotors 1 and 4 move at high speed and rotors 2 and 3 move at normal speed. Pitch is used to control the forward and backward movement of a quadcopter. To move forward, rotors 1 and 2 move at normal speed, while rotor 3 and 4 move at high speed. To move backward, rotors 1 and 2 run at high speed while rotors 3 and 4 run at normal speed. Roll is used to cause the quadcopter to bend left or bend right. In order to roll to the left, rotors 1 and 3 run at normal speed while rotors 2 and 4 run at high speed. To roll to the right, rotors 1 and 3 run at high speed and rotors 2 and 4 run at normal speed. Vertical positioning, e.g. ascent and descent are caused, respectively, by operating all rotors at high speed, and by operating all rotors at slower speeds.

FIG. 2 illustrates another exemplary sunshade device 210. Sunshade device 210 is a generally rectangular canopy 220 supported by a plurality of lifting devices 240. In the description above and below, the sunshade device 210, canopy 220, and lifting devices 240, are all the same as or similar to the corresponding sunshade device 110, canopy 120, and lifting devices 140, and the description of sunshade device 110, canopy 120, and lifting devices 140 applies to the sunshade device 210, canopy 220, and lifting devices 240.

Figure 3:
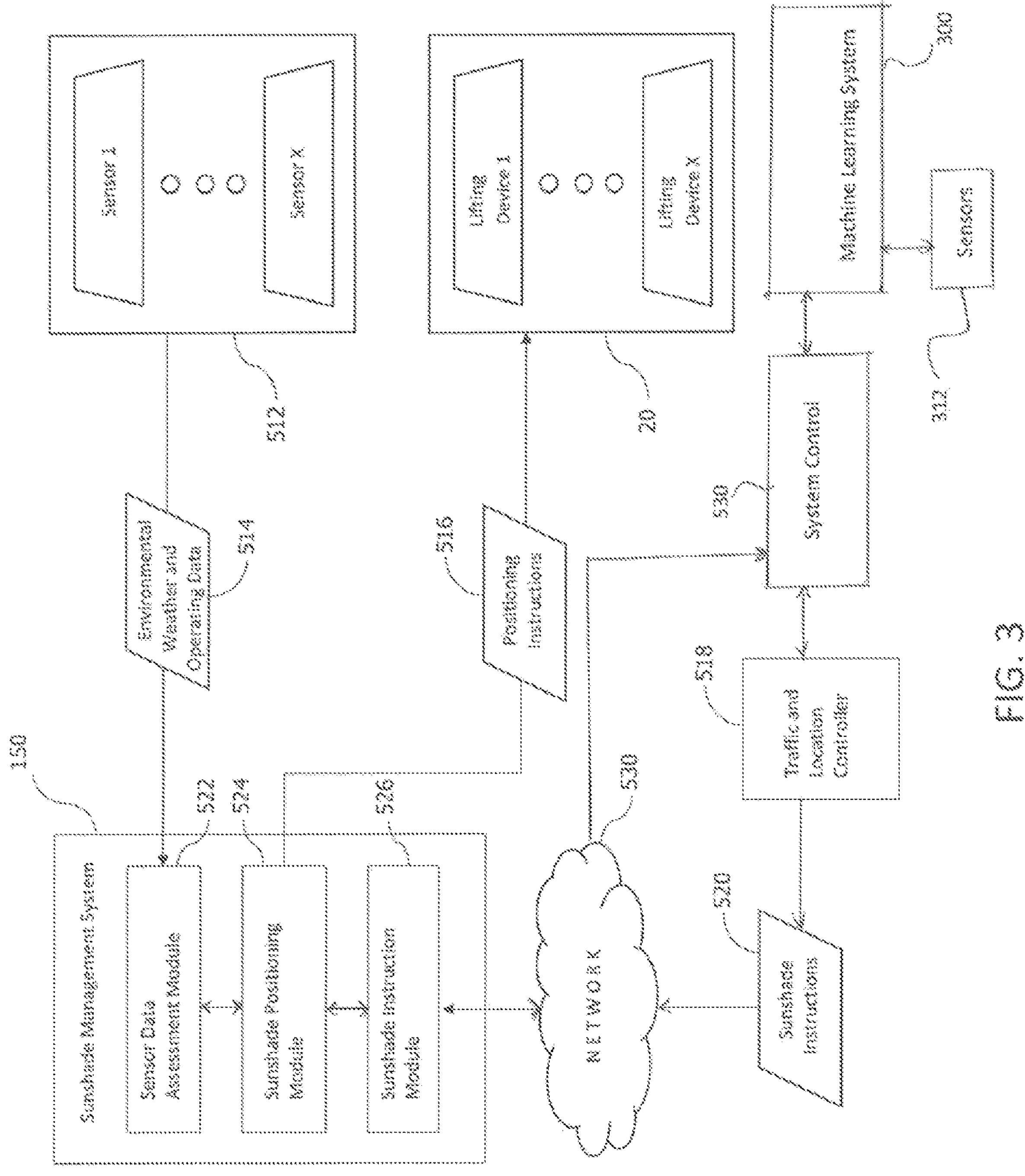
FIG. 3 depicts a schematic representation of an exemplary sunshade management system.
Figure 4:
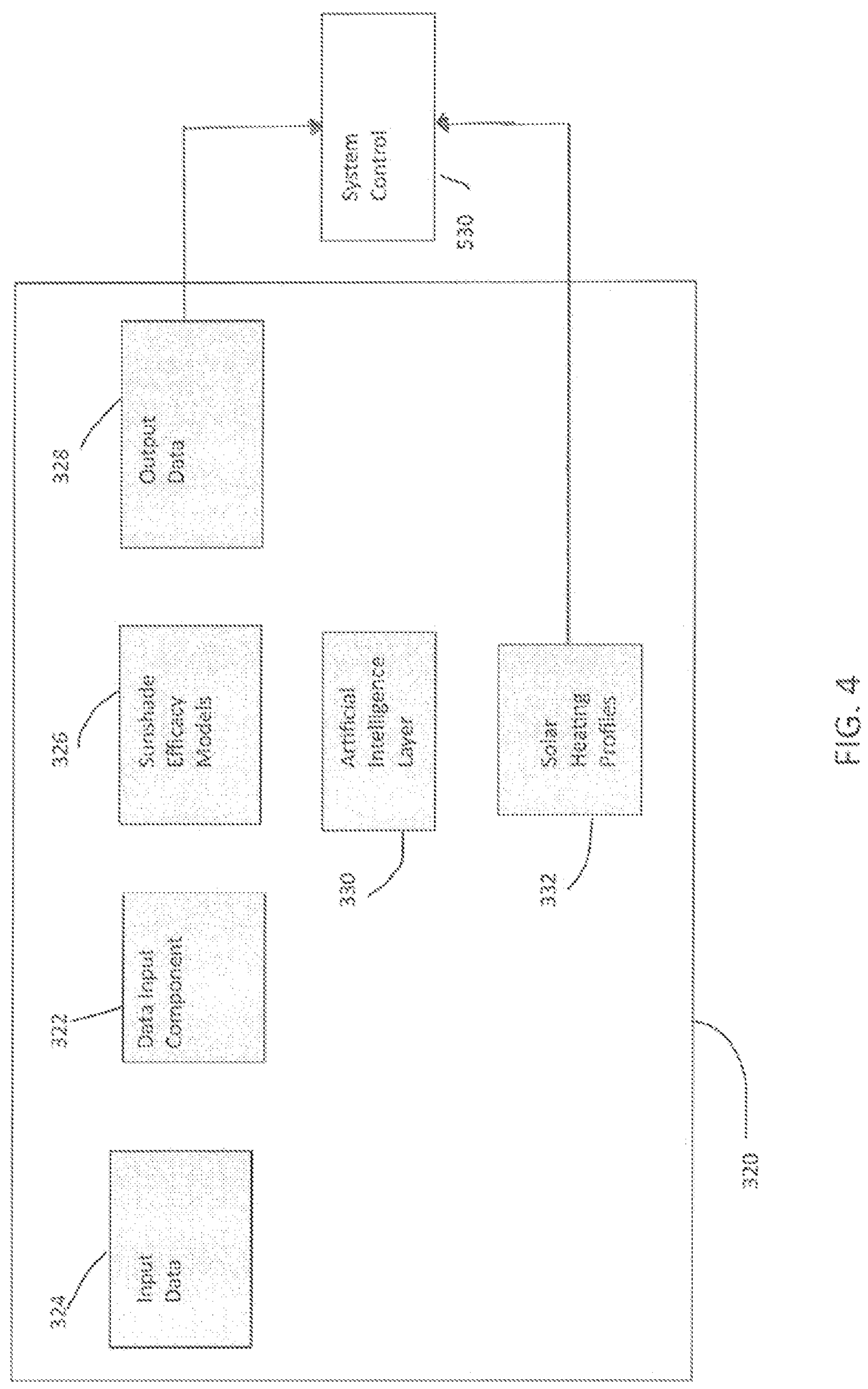
FIG. 4 depicts a schematic representation of an artificial learning machine learning process for training the sunshade management system.

FIG. 3 depicts a schematic representation of the sunshade management system 150 on board sunshade devices 110, 210 and its interaction with various other components.

Sunshade management system 150 controls the elevation and angle (pitch) and geolocation (latitude and longitude) positioning of the sunshade device 110, 210 based on sunshade instructions 520 provided by a system control 530 via a traffic and location controller 518. Sunshade management system 150 controls the one or more lifting devices 140 to activate them to lift the sunshade device 110, 210 and/or to deactivate or reduce activity of the lifting devices 140 to cause the sunshade device 110, 210 to descend. For example, sunshade management system 150 may activate the lifting devices 140 to lift the sunshade device 110, 210 when a sunshade device altitude measurement is equal to or below a preselected minimum altitude setting. Sunshade management system 150 may deactivate or reduce activity of the lifting devices 140 to allow descent of the sunshade device 110, 210 when a sunshade device altitude measurement is equal to or greater than a preselected maximum altitude setting.

The sunshade management system 150 is in electronic communication with the lifting devices 140, either directly or over a wireless connection. Accordingly, the sunshade management system 150 is capable of: controlling the state of collapse or opening of the canopy 120; controlling the elevation and geolocation positioning of the sunshade device 110.

In typical embodiments, sunshade management system 150 incorporates a central flight controller module as part of a sunshade positioning module 524. The central flight controller includes an Inertial Measurement Unit (IMU), a gyroscope, and satellite positioning (GPS and GLONASS). An accelerometer may be provided to determine orientation relative to the earth's surface. Obstacle detection sensors may be included. The central flight controller receives data from IMU, Gyroscope, GPS modules, accelerometer, and obstacle detection sensors, and using programmed flight parameters and algorithms it calculates speed settings for each rotor, and sends control signals to electronic speed controllers (ESC) associated with each motor. The central flight controller module 152 may have additional features such as intelligent orientation control (IOC); signal to the motor ESCs on thrust and direction; intelligent landing gear; auto return to home; multi rotor fail protection; highly sensitive built-in damper IMU module; satellite receiver; and banked turn mode.

The sunshade management system 150 works under the control of a traffic and location controller 518 which provides sunshade instructions 520, for example, specific take-off time, geolocation, flight path, flight altitude, flight time, landing time and landing geolocation instructions to the sunshade management system 150. The sunshade instructions 520 may be delivered on a regular schedule and/or may be updated as needed in real time.

The actions of the traffic and location controller 518 are directed by a system control 530 which coordinates the operations of multiple sunshade devices 110, 210. User input to control the activity of one or more sunshade device 110, 210 is entered in the system control 530 and may include one or both of human user input and computer generated user input.

System control 530 communicates via traffic and location controller 518 and a wireless network, providing sunshade instructions 520 to the sunshade management system 150. User input, including one or both of human user input and computer generated user input, are entered in system control 530. User input may, for example, instruct the sunshade management system 150 to generate lift instructions 516 to ground the sunshade device 10 for maintenance. User input may direct the sunshade management system 150 to position the sunshade device 10 at a certain geographic position, or at a certain height, or angle to the sun. The sunshade instructions 520 may be used to improve the efficacy of the sunshade device 110 or for other, non-functional reasons, such as to form a shape or illuminate messages.

Embodiments of the sunshade management system 150 may employ a sunshade instruction module 526 to obtain, parse, and communicate the sunshade instructions 520 received from Traffic and location controller 518 with the other components of the sunshade management system 150. Such embodiments provide for fluid and optimized functionality of the sunshade management system 150 by compartmentalizing the data analysis and instruction generation functions of the sunshade management system 150.

Preferably, the sunshade management system 150 is provided with one or more sensors 512 for sensing one or more of the sunshade's altitude, elevation from the earth's surface, air temperature, barometer pressure, humidity, wind speed and direction, GPS signals, solar intensity, solar angle. The one or more sensors 512 may be associated with the container 133 or they may be distributed at various locations on the canopy 120 and lifting devices 140.

Sensors 512 additionally include appropriate sensors to detect and transmit maintenance related data and information, such as damage to the sunshade's canopy 120, low-power or malfunctioning lifting devices 140, etc. In particular, sensors 512 may be provided to detect system battery voltage so that if a low voltage threshold is detected, operation of the lifting devices 140 can be suspended.

Embodiments of the sunshade management system 150 receive environmental, weather, and operating data 514 provided by one or more sensors 512. Data 514 obtained by the sensors 512 allow the sunshade management system 150 to make determinations as to activation and deactivation of the lifting devices 140 within the requirements of the sunshade instructions 520. The sunshade management system 150 then uses the data and information collected by and transmitted from the sensors 512 to make real-time determinations about the positioning of the sunshade device 110, 210.

The sunshade management system 150 preferably employs a sensor data assessment module 522 to obtain the environmental, weather, and operating data 514 and related information from the sensors 512, perform an analysis of the present environment and anticipated future environment based upon the data 514, and determine the optimal course of activities for the sunshade device 110, 210. The data assessment module 522 preferably performs these functions on a continuous and real-time basis such that the sunshade management system 150 is constantly reconsidering the optimal placement, shape, etc. for the sunshade device 110, 210.

Using the data 514 received from the sensors 512, the sensor data assessment module 522 causes the sunshade positioning module 524 to generate updated positioning instructions 516 and transmit those instructions to the lifting devices 140. The positioning instructions 516 can alter the angle or elevation of the sunshade device 110, 210 to reduce the footprint of or ground the sunshade device 110 or re-position or otherwise alter the sunshade device 110, 210. The positioning instructions 516 are preferably executed by the lifting devices 140 all immediately, continuously, and in real-time.

Thus, for example, the system control 530 may instruct the sunshade management system 150 to activate the sunshade device 110, 210 into a flight mode, but if ambient conditions of temperature, sunlight, and humidity determined by sensors 512 are appropriate and sufficient to discontinue operation of the sunshade device 110, 210 and ground it for the night, the sunshade management system 150 may make that determination and take action autonomously based on the data 514. In other situations, grounding of the sunshade device 110, 210 is necessary due to one or more of weather, safety, and battery power of the sunshade device 110.

In the case of extreme weather events, the sunshade management system 150 may determine that the sunshade 110 should be folded up, grounded, or otherwise protected until the severe weather event ends. In the event of present or imminent severe weather, the sunshade management system 150 preferably acts to protect and preserve the sunshade device 110 by taking appropriate action. Such actions may include collapsing the sunshade device 110 but maintaining its elevation, grounding the sunshade device, or a combination. Such actions may also include moving the sunshade device 110 or increasing or reducing its elevation to avoid the severe weather.

In some embodiments, a ground-based machine learning system 300 is provided with machine learning algorithms to optimize performance of aerial sunshade devices 110 and provide instructions to system control 530 which then provides instructions to the traffic and location controller 518, which transfers sunshade instructions 520 to the sunshade management system 150. The machine learning module 300 receives information from a plurality of sunshade devices 110, in particular from the sensors 512 via the sensor data assessment module 522 and/or the sunshade positioning module 524, and also from a plurality of additional ground-based sensors 312 located at or near the earth's surface, and from commercial weather data sources. Such sensors or weather data may include sensors for measurement of GPS signal strength/presence/data, air temperature, humidity, precipitation, barometric pressure, wind speed and direction, solar intensity and angle, infrared or visible or ultraviolet light intensity, solar heating intensity, percentage of cloud cover, percentage of shade provided.

The machine learning module 300 can learn optimal positioning of sunshade devices 110. The learned positioning can be stored in the system control 530 and used to generate position instructions for individual sunshade devices 110, 210 in a swarm to optimize the effect of shade provided by the aerial sunshade devices 110, 210. For example, the machine learning system 300 may determine that optimal shade effects are obtained by certain positioning of the sunshade devices at certain times and solar conditions. In this way, the system control 530 can be improved the longer the sunshade device 110, 210 remains deployed and the system control 530 remains active.

In another application of machine learning, the machine learning module 300 may learn that certain data indicates incoming extreme weather, and the system control 530 in such case will issue instructions to traffic and location controller 518 to ground the sunshade devices 110, 210 until the weather has passed.

In some embodiments, there may be a plurality of sunshade devices 110 in communication with each other and with the system control 530 to coordinate their actions, for example, one sunshade device 110, 210 may be descending while a different one is ascending, to thereby optimize positioning and continuity of shade case by the sunshade devices 110, 210. A swarm of autonomously controlled networked sunshade devices 110, 210 can thereby operate independently in remote locations without requiring continuous direct control, which may require on-site or satellite control systems. The plurality of sunshade devices may communicate with each other to form an aerial mesh network whereby instructions received by one sunshade device are relayed across the mesh network to the intended recipient sunshade device which can act on the received instructions.

A mesh network is a network in which nodes are communicatively linked together, either directly or indirectly, and branch off other nodes. A node may be the sunshade management system 150 in each sunshade device 110, 210. A mesh network may be a full mesh network in which each node is connected directly to all other nodes. In some embodiments, mesh network may be a partial mesh network, in which only some nodes connect directly to one another. In a partial mesh network, a first node may require a second node to communicate to a third node. A mesh network may include multiple routers, switches, or other devices. A mesh network may use a routing technique such that data is propagated along a communication path from node to node until the destination is reached. In some embodiments, mesh network may use a flooding technique in which a message is sent to all nodes in the mesh network, thus requiring no routing. Network 530 may be configured to use a flooding technique, wherein data is transmitted to all nodes in the network 530. In some embodiments, network 530 may incorporate time division multiple access and high-accuracy synchronization to allow retransmissions to occur simultaneously so the data propagates one hop in all directions at precisely the same time and avoids collisions. In some embodiments, network 530 may be configured to use a routing technique in which data is passed along designated nodes forming a determined route until the destination is reached.

Network 530 may be configured to provide swarm communication among sunshade devices 110, 210. In some embodiments, network 530 may be configured for one of the sunshade devices 110, 210 to communicate directly to others of the sunshade devices 110, 210. This can be useful where the sunshade devices 110, 210 are flying in separate or spread out flight paths, and one of the sensors 512 of the sunshade devices 110, 210 detects potential problem issues and relays the sensor data to other sunshade devices 110, 210 and/or to the system control 530.

The machine learning system 300 is able to make determinations regarding appropriate timing of takeoff and shutdown, and positioning of the elevation and angle of canopy 120 relative to the ground below, to maximize the shade effects of canopy 120.

Machine learning system 300 includes a plurality of data processing modules 320 which include a data input component 322, which is configured to perform the input, retrieval, request, reception, acquisition or obtaining of input data 324, and initialize models 326 for assessing sunshade efficacy and generating output data 328. The data input component 322 may issue one or more requests for, and fetch additional input data 324 beyond the original inputs.

The sunshade efficacy models 326 are configured to use the input data 324, the sensor 512 data 514, and the ground sensor 312 to analyze sunshade efficacy, based on local temperature control to desired setpoints. Models 326 may determine that due to clouds and other weather conditions, activation of sunshade devices 110, 210 is not effective, and that such devices should be kept grounded. Localized weather conditions obtained from input data 324 can be used to predict or forecast expected weather conditions at one or more geographical locations and to make determinations about optimal use of the sunshade devices 110, 210.

Geographical region models 326 can be generated for specific regions, such as Rocky Mountain areas, Dakotas, or desert areas; or urban areas such as Houston, Texas or New Orleans, Louisiana. Different models may be generated for different types of geographies, such as mountainous areas, plateaus, forested areas, farmland, etc.

Since weather patterns can change based on the month or season, seasonal models 326, including region models, can be generated for specific times of year, e.g., specific months, seasons, etc. For example, a model 326 can be generated for spring, summer and fall seasons.

Meteorological and climatological input data 324 can be derived or obtained from many different sources. For example, numerical weather models (NWP) and/or surface networks may be combined with data from weather radars and satellites to reconstruct the current weather conditions on any particular area to be analyzed. Examples of NWP models that may be used include RUC (Rapid Update Cycle), WRF (Weather Research and Forecasting Model), GFS (Global Forecast System), and GEM (Global Environmental Model). Meteorological information is received in real-time, and may come from several different NWP sources, such as from Meteorological Services of Canada's (MSC) Canadian Meteorological Centre (CMC), as well as the National Oceanic and Atmospheric Administration's (NOAA) Environmental Modeling Center (EMC), and many others. Additionally, internally or privately-generated NWP models developed from data collected from the sensors 512 and 312 may be used. Other sources of input data 324 may include weather image data, such as satellite images and other spectral data.

The output data 328 of the sunshade efficacy models 326 includes temperature, and temperature reduction achieved by the sunshade device 110, 210; moisture, and moisture increase achieved by the sunshade device 110, 210; and solar radiation, and solar radiation reduction achieved by the sunshade device 110, 210. The output data can be provided to the system control 530 to cause the system control 530 to update its instructions to the plurality of aerial sunshade devices under its control.

The sunshade efficacy models 326 can be evaluated through one or more artificial intelligence layers 330, to produce a plurality of solar heating profiles 332 which are data sets for use by the system control 530 as a table of recommended control actions for particular events or seasonal periods. The sunshade efficacy models 326, together with the artificial intelligence layers 330 allow the machine learning system 300 to develop relationships between the various types of input data 324 to assess the efficacy of different variables relevant to the sunshade devices 110, 210, including device size, altitude, angle to solar rays, number and separation of multiple such sunshade devices 110, 210; local temperature, solar brightness, and many other variables that many be identified by the machine learning system 300. The artificial intelligence layer 330 can associate and compare the various types of input data 324 and identify relationships in such input data 324 in a combined analysis that produces solar heating profiles 332 representing a learned best practice to obtain a maximum sunshade device efficacy. The solar heating profiles 332 can then be used by the system control 530.

For instance, the artificial intelligence layer 330 can be applied to a first dataset to draw associations and identify relationships between the available external data, and as more data is acquired, the solar heating profiles will be updated as data provides insight into the most effective use of the sunshade devices to control surface temperature. This information may be used to identify which factors are particularly important in obtaining temperature relief, and thus help to improve the efficacy of the sunshade devices.

Many different types of artificial intelligence may be used in the artificial intelligence layer 330, which may include one or more of such types of artificial intelligence. The artificial intelligence modeling layer 330 may apply techniques that include, but are not limited to, k-nearest neighbor (KNN), logistic regression, support vector machines or networks (SVM), and one or more neural networks.

In one embodiment, the modules can include one or more trained neural network models, for example, recurrent neural network models (e.g., RNNs, LSTMs, GRUs, etc.), convolutional neural networks, etc. Multiple neural network models may be connected together, e.g., the output of one neural network model may be used as the input of another neural network model. For example, satellite image data showing solar shading effects may be processed by a convolutional neural network or another model adapted for processing image data, and the sensor data 312 and 512, in combination with the output of the model processing the image data, may be processed by a second model adapted to process such data to generate a sunshade efficacy determination.

Although the machine learning system is used, the system should not be made fully autonomous because of issues such as public safety, and user input may be needed to override a machine learning system data output.

The present invention provides a sunshade device 110 which has little to no energy footprint, and which can be strategically deployed to mitigate the harmful effects of climate change over large portions of the earth's surface. Those of ordinary skill in the art will recognize the efficacy of the embodiments described herein for accomplishing the present invention's objectives. While the invention has been described with reference to particular embodiments and arrangements of parts, features, and the like, it is not limited to these embodiments or arrangements. Indeed, modifications and variations included in these teachings will be ascertainable to those of skill in the art.

What is claimed is:

1. A system control having an artificial intelligence system, for controlling a plurality of aerial sunshade devices, comprising:

a plurality of aerial sunshade devices having a canopy for providing shade from a sun formed of a flexible lightweight sheet material, one or more electrically powered lifting devices attached to the canopy, a rechargeable battery power system operatively connected to the at least one lifting device, one or more solar cells operatively connected to the battery power system to charge the battery power system, a sunshade management system controlling the one or more lifting devices to activate the lifting devices to position the sunshade device;

the system control providing sunshade instructions to the plurality of aerial sunshade devices via a traffic and location controller and a wireless network;

the sunshade instructions including an altitude and a geolocation positioning instruction for each aerial sunshade device;

a machine learning system which has a data processing module having a data input component, a sunshade efficacy model, a data output component, and one or more artificial intelligence layers which produce solar heating profiles;

the data output component providing data output to the system control; and the solar heating profiles being provided to the system control.

2. The system control of claim 1, further comprising: the sunshade instructions including an angle of the aerial sunshade device relative to one or more of a contour of a location above which the aerial sunshade device is positioned and a position of the sun.

3. The system control of claim 1, wherein the sunshade management system comprises:

a sunshade instruction module for receiving the sunshade instructions regarding an altitude and a geolocation positioning of the aerial sunshade device;

a sensor data assessment module for receiving environmental and weather data from a plurality of sensors; and a sunshade positioning module for controlling the one or more lifting devices to activate them to position the aerial sunshade device to an altitude and a geolocation positioning received by the sunshade instruction module.

4. The system control of claim 3, wherein the sunshade positioning module positions the sunshade device to an altitude and a geolocation positioning received by the sunshade instruction module as modified by the sensor data assessment module.

5. The system control of claim 3, wherein the aerial sunshade devices further comprise:

a plurality of sensors for obtaining environmental and weather data and providing the environmental and weather data to the sensor data assessment module; and a plurality of sensors for obtaining operating data and providing the operating data to the sensor data assessment module.

6. The system control of claim 1, wherein the system control receives weather data, and provides the sunshade instruction based on the weather data.

7. The system control of claim 1, wherein the system control receives weather data, and provides a grounding sunshade instruction based on the weather data.

8. The system control of claim 1, wherein the system control determines if grounding of the aerial sunshade device is necessary due to weather or safety.

9. A system control for controlling a plurality of aerial sunshade devices, comprising:

a plurality of aerial sunshade devices having a canopy for providing shade from the sun formed of a flexible lightweight sheet material, one or more electrically powered lifting devices attached to the canopy, a rechargeable battery power system operatively connected to the at least one lifting device, one or more solar cells operatively connected to the battery power system to charge the battery power system, a sunshade management system controlling the one or more lifting devices to activate the lifting devices to position the sunshade device, a plurality of sensors for obtaining environmental and weather data and providing the environmental and weather data to the sunshade management system, a plurality of sensors for obtaining operating data and providing the operating data to the sunshade management system;

the system control providing sunshade instructions to the plurality of aerial sunshade devices via a traffic and location controller and a wireless network; and the sunshade instructions including an altitude and a geolocation positioning instruction for each aerial sunshade device.

10. The system control of claim 9, wherein the sunshade management system comprises:

a sunshade instruction module for receiving the sunshade instructions regarding an altitude and a geolocation positioning of the aerial sunshade device;

a sensor data assessment module for receiving environmental and weather data from a plurality of sensors; and a sunshade positioning module for controlling the one or more lifting devices to activate them to position the aerial sunshade device to an altitude and a geolocation positioning received by the sunshade instruction module.

11. The system control of claim 10, wherein the sunshade positioning module positions the sunshade device to an altitude and a geolocation positioning received by the sunshade instruction module as modified by the sensor data assessment module.

12. The system control of claim 9, further comprising a machine learning system which has a data processing module having a data input component, a sunshade efficacy model, and a data output component, the data output component providing data output to the system control.

13. The system control of claim 12, wherein the machine learning system further comprises a layer of artificial intelligence producing solar heating profiles, the solar heating profiles being provided to the system control.

14. The system control of claim 12, wherein the system control determines if grounding of the aerial sunshade device is necessary due weather or safety.

15. The system control of claim 9, wherein the system control receives weather data, and provides the sunshade instruction based on the weather data.

16. The system control of claim 9, wherein the system control receives weather data, and provides a grounding sunshade instruction based on the weather data.

17. An aerial sunshade device, comprising:

a canopy for providing shade from a sun formed of a flexible lightweight sheet material;

one or more electrically powered lifting device attached to the canopy;

a rechargeable battery power system operatively connected to the at least one lifting device;

one or more solar cells operatively connected to the battery power system to charge the battery power system;

a sunshade management system controlling the one or more lifting devices to activate the lifting devices to position the sunshade device and having a sunshade instruction module for receiving sunshade instructions regarding an altitude and a geolocation positioning of the aerial sunshade device, a sensor data assessment module for receiving environmental and weather data from the plurality of sensors, and a sunshade positioning module for controlling the one or more lifting devices to activate the one or more lifting devices to position the sunshade device to an altitude and a geolocation positioning received by the sunshade instruction module;

a plurality of sensors for obtaining environmental and weather data and providing the environmental and weather data to the sunshade management system; and a plurality of sensors for obtaining operating data and providing the operating data to the sunshade management system.

18. The aerial sunshade device of claim 17, wherein the sensors for obtaining environmental and weather data comprise one or more sensors for sensing altitude of the aerial sunshade device, air temperature, barometric pressure, or humidity.

19. The aerial sunshade device of claim 17, wherein the sensors for obtaining operating data comprise one or more sensors for sensing battery power available from the battery power system.

20. The aerial sunshade device of claim 17, wherein the sunshade management system controls an altitude and a geolocation positioning of the aerial sunshade device.

21. The aerial sunshade device of claim 18, wherein the sunshade management system controls an angle of the aerial sunshade device relative to a contour of a location above which the aerial sunshade device is positioned.

22. The aerial sunshade device of claim 18, wherein the sunshade management system controls an angle of the aerial sunshade device relative to the position of the sun.

23. The aerial sunshade device of claim 17, wherein the sunshade positioning module positions the aerial sunshade device to an altitude and a geolocation positioning received by the sunshade instruction module as modified by the sensor data assessment module.

24. The aerial sunshade device of claim 17, wherein the at least one lifting device comprises a propeller-driven device.

* * * * *